United States Patent [19]

Eigner et al.

[11] 3,987,135
[45] Oct. 19, 1976

[54] PROCESS OF PRODUCING SINTERED MAGNESIA

[75] Inventors: Erich Eigner; Robert Bergmann, both of Radenthein, Austria

[73] Assignee: Osterreichisch-Amerikanische Magnesit Aktiengesellschaft, Carinthia, Austria

[22] Filed: Apr. 19, 1972

[21] Appl. No.: 245,552

[30] Foreign Application Priority Data
Apr. 21, 1971 Austria .................... 3383/71

[52] U.S. Cl. .................... 264/66; 106/58; 264/120
[51] Int. Cl.² .................... C04B 33/32; C04B 35/04
[58] Field of Search ............... 106/58; 264/66, 332, 264/120

[56] References Cited
UNITED STATES PATENTS

| | | | |
|---|---|---|---|
| 3,378,615 | 4/1968 | Zisner | 106/58 X |
| 3,573,079 | 3/1971 | Shibasaki | 106/58 |
| 3,666,851 | 5/1972 | Chaklader | 264/332 X |
| 3,676,079 | 7/1972 | Morgan | 264/332 X |
| 3,702,881 | 11/1972 | Chaklader | 264/332 X |

*Primary Examiner*—Robert F. White
*Assistant Examiner*—Thomas P. Pavelko
*Attorney, Agent, or Firm*—Everett H. Murray, Jr.

[57] ABSTRACT

An improved process of forming sintered magnesia bodies from a magnesium hydroxide aqueous slurry wherein the slurry is dried to a moisture content where the solids can be compacted to self-supporting bodies, preferably about 5 to 8% moisture, by heating at a temperature below the dissociation temperature of the magnesium hydroxide, compacting the dried magnesium hydroxide into briquettes, heating the briquettes at a temperature above the dissociation temperature of magnesium hydroxide to form magnesia, re-compacting to form new briquettes of greater density, and heating to sintering temperature to sinter the briquettes.

4 Claims, 1 Drawing Figure

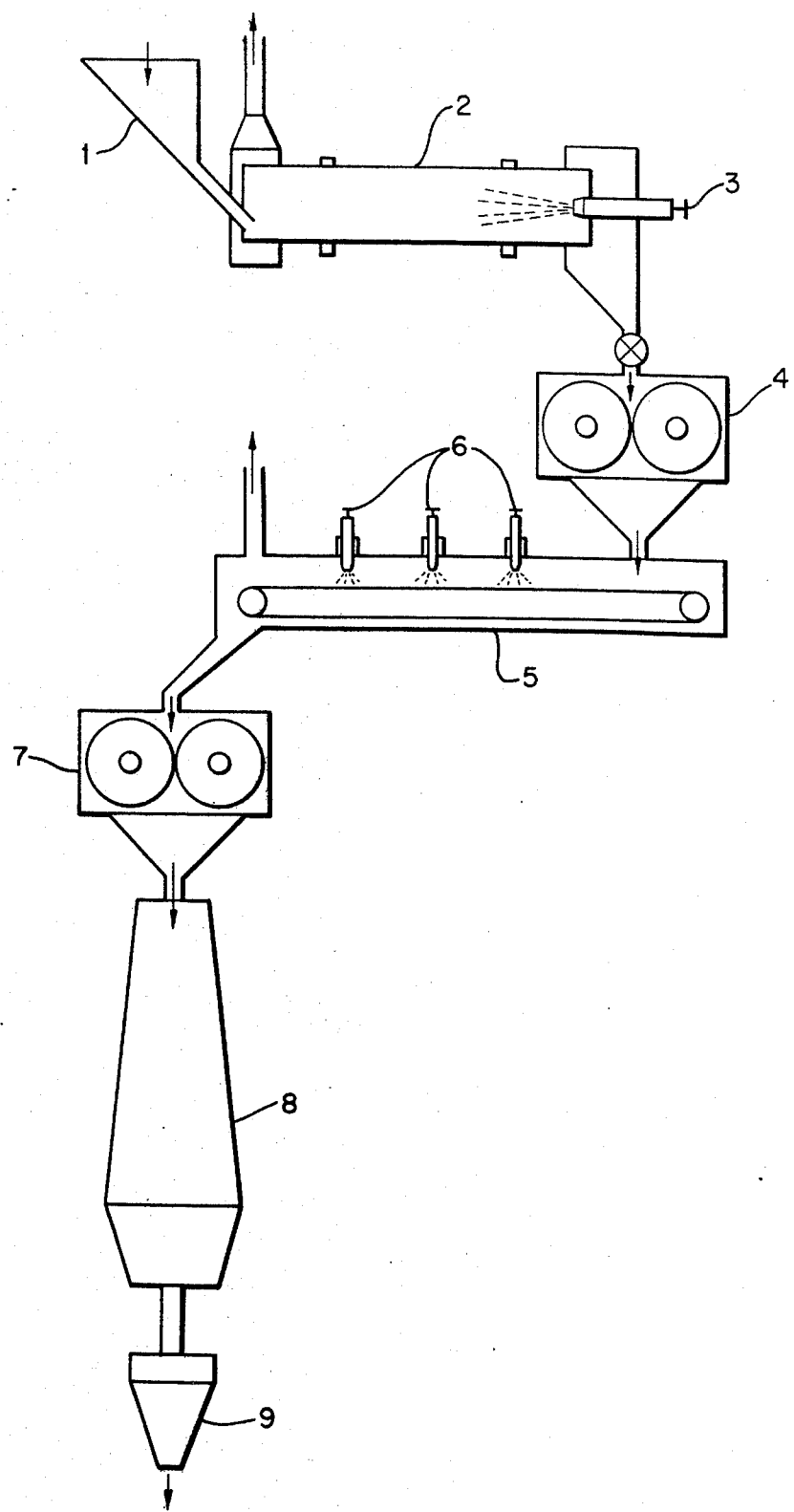

PROCESS OF PRODUCING SINTERED MAGNESIA

The present invention relates to a process for producing sintered bodies of magnesia from an aqueous magnesium hydroxide slurry, wherein the slurry is dried to a compacting moisture content, compacted, dissociated to form magnesia, recompacted to a greater density, and heated to sinter the briquettes.

It is well known in the art to produce sintered magnesia from aqueous magnesium hydroxide slurries, wherein the slurry is dried and heated to about 900° C in sequential operations in a single multiple hearth kiln, such as the design attributed to Herreshoff. The procedure produces a caustic magnesia in powdered form having an ignition loss of up to 2%. The powder cannot be effectively briquetted in a single operation for sintering: the powder is compacted in a press and when the briquette is removed, it disintegrates into a combination of crumbs and fines. Only the crumbs can be effectively utilized in a second compacting operation to prepare self-supporting briquettes, and it is thus necessary to recycle the fines, which constitute a considerable proportion of the material. It has also proved a practical necessity to recycle about 30% of the pre-compacted crumb to increase the productive yield of the precompacting operation. Other difficulties occur in the operation which increase the complexity and cost of the operation. The pre-compacted crumb to be formed into briquettes is not readily handled or metered into the briquetting press and requires specialized equipment and operations. The procedure also suffers from the functional disadvantage of irregular quality of the compaction procedures and substantial portions of the sintered briquettes will be found to have an apparent specific gravity lower than is tolerable in use.

It is also known to improve the compaction procedures by the use of suitable binders, but such procedures have not proved generally acceptable because of the considerable additional cost and the presence of the binder material in the briquettes is also often objectionable.

In another procedure, a magnesium hydroxide slurry is dried and dehydrated to remove most of the water of hydration, i.e., $Mg(OH)_2 \cdot H_2O = Mg(OH)_2 + H_2O(\rightarrow)$, but not dissociate the magnesium hydroxide to magnesia. At residual moisture contents of about 5 to 7%, the hydroxide can be compacted into reasonably strong, self-supporting briquettes which are then sintered. While this procedure is far simpler and less expensive than the customary technique hereinabove described, for many purposes the briquettes of this procedure are unsatisfactory because of the low apparent specific gravity which results from the loss of water which occurs upon the dissociation of magnesium hydroxide to magnesia, i.e., $Mg(OH)_2 = MgO + H_2O(\rightarrow)$. Briquettes prepared by this procedure are also particularly susceptible to abrasion, with the generation of fines.

It is accordingly an object of the present invention to provide an advantageous improvement in the production of sintered magnesia briquettes without the numberous disadvantages and objectionable features of the prior art techniques. It is a further object to produce sintered magnesia briquettes of a greater uniformity and quality, having higher bulk specific gravity.

It has now been found that the foregoing objects, and still others to become apparent from the following disclosure, are attained by the process of the present invention, wherein an aqueous slurry of magnesium hydroxide is dryed and dehydrated without substantial dissociation to a water content suitable for compacting to a self-supporting, coherent briquette, such briquettes are formed and then heated to dissociation temperature to form magnesia without substantial sintering, and the resulting magnesia briquettes are again pressed to a more dense form and finally sintered.

The initial steps of drying and pressing to form self-supporting briquettes of magnesium hydroxide are per se known and in the present invention are practiced in accordance with conventional procedures, and employing conventional and commercially available equipment. The drying operation can be conducted by heating to any convenient temperature below that at which dissociation of the magnesium hydroxide occurs, i.e., below about 700° C, and preferably below about 600° C, to a moisture content suitable for the compacting procedure, preferably about 5 to 8 weight percent. The dried magnesium hydroxide is then compacted in a suitable press to form self-supporting briquettes. A convenient pressure for the operation will be about 500 kg/cm$^2$.

The briquettes thus formed are heated to dissociate the magnesium hydroxide to magnesia, at temperatures at which no appreciable degree of sintering will occur. Thus, the temperature will be at least about 600° C, preferably at least about 700° C, and not more than about 1200° C, preferably not more than about 900° C. The period of the heating step should be sufficient that the resulting magnesia has little or no ignition loss. The briquettes thus obtained are extremely strong and can be handled well, but have such a high degree of porosity that if directly sintered, an extremely poor bulk specific gravity will result.

It has proved, however, that these briquettes can effectively be pressed in a second briquetting operation to a considerably higher density than can normally be attained in conventional processing techniques and can thereafter be sintered to form highly consistent briquettes of uniform characteristics and exceptionally good bulk specific gravity. The second pressing step can be conducted at any convenient temperature below the sintering temperature, unlike the limitations of the prior art procedures, with little or no production of fines. The pressures of the second compaction are generally the same as those of the first briquetting operation, eg., for example, about 500 kg/cm$^2$. Sintering can follow directly thereafter, at conventional and convenient temperatures, well known in the art. A preferred temperature is about 1900° C.

In a preferred embodiment of the method of the present invention, the process is initially conducted in a Herreshoff double sectioned kiln. Magnesium hydroxide is fed as a thick slurry into the low temperature section at about 300° C and dried to a moisture content varying between 5 and 8 weight percent. The dried powder is removed from the kiln and briquetted, and the briquettes returned to the high temperature section of the kiln and heated there to a temperature of about 900° C. The briquettes are removed from the kiln, repressed and sintered.

In an alternative operation, the magnesium hydroxide slurry can be dried in a rotary dryer in a separate operation. Such an operation results in granules rather than a fine powder, which operates, however, equally well in the briquetting operation.

The invention will now be explained more fully with reference to the accompanying drawing and the following example.

The magnesium hydroxide slurry to be processed is charged into a feed hopper 1, from which the slurry is fed into a dryer 2, which is provided with a heat source 3, and in which the slurry is dried to the desired water content. The dried slurry is then supplied to the first briquetting stage 4 and is precompacted therein. The resulting briquettes are fired to form caustic magnesia in any desired firing means 5, which comprise, e.g., a sintering belt conveyor heated by burners 6. The caustic magnesia briquettes are supplied to the second briquetting stage 7, and are pressed therein to form fully compacted briquettes. The dryer 2 and the firing means 5 may be combined in a unit, such as, e.g., a Herreshoff kiln. The fully compacted briquettes are then sintered in a sintering unit 8, conveniently by a shaft kiln or rotary kiln, and subsequently cooled in a cooler 9 and removed from the latter as the final product.

EXAMPLE

An $MgCl_2$ mother liquor was treated with $Ca(OH)_2$ to precipitate an $Mg(OH)_2$ slurry, which after filtration had a moisture content of 55%. A sample of this slurry was dried and deadburned and had then the following chemical composition:

| | |
|---|---|
| $SiO_2$ | 1.50% |
| $Fe_2O_3$ | 0.20% |
| $Al_2O_3$ | 0.15% |
| CaO | 2.50% |
| MgO | 95.65% |

The moist $Mg(OH)_2$ slurry obtained by filtration was dried in a rotary dryer at 300° C. to a water content of 6% and then pressed under a pressure of 500 kg/cm² into briquettes. These briquettes were egg-shaped and had a volume of about 30 cm³ each and an apparent specific gravity of 1.5 g/cm³. They were heated at 800° C. for 4 hours. After this treatment, their shape was more or less unchanged and they were also sufficiently strong, so that they could easily be handled. On the other hand, their specific gravity had been reduced to 1.20 g/cm³. These briquettes were then charged to a second briquetting press, in which they were crushed and formed at about 500 kg/cm² into new briquettes, which may be described as fully compacted briquettes. There were almond-shaped and had an apparent specific gravity of 2.0 g/cm³ and a volume of about 10 cm³ each, i.e., they were somewhat smaller than the original briquettes. The fully compacted briquettes were very strong, so that only little dust was evolved when they were handled and subsequently sintered. Sintering was effected at 1900° C. and resulted in a magnesia having an apparent specific gravity of 3.35 g/cm³, which is sufficient for substantially all purposes. The analysis of the resulting magnesia corresponded to the above mentioned composition.

What is claimed is:
1. The method of producing sintered high density magnesia bodies from an aqueous magnesium hydroxide slurry, comprising the sequential steps of
   A. drying said slurry to a powder having a moisture content such that the magnesium hydroxide can be pressed to form self-supporting bodies,
   B. compacting said powder in molding means to form self-supporting briquettes,
   C. removing said briquettes from said molding means,
   D. heating said briquettes free from any mold under ambient pressure in said heating zone to a temperature above the dissociation temperature of magnesium hydroxide and below the sintering temperature of magnesia,
   E. recompacting said briquettes to a greater apparent specific gravity of about 2.0 g/cm³, and
   F. sintering said briquettes.
2. The method of claim 1 wherein the moisture content of said powder is about 5 to 8 weight percent.
3. The method of claim 1 wherein said heating is at a temperature of from about 700° to 900° C.
4. The method of claim 1 wherein said heating is continued until the briquettes have essentially no ignition loss.

* * * * *